(12) United States Patent
Liske et al.

(10) Patent No.: US 12,517,005 B2
(45) Date of Patent: Jan. 6, 2026

(54) APPARATUS AND METHOD FOR MEASURING AN OPTICAL PROPERTY OF AN OPTICAL SYSTEM

(71) Applicant: TRIOPTICS GMBH, Wedel (DE)

(72) Inventors: Gabriel Liske, Hamburg (DE); Aiko Ruprecht, Wedel (DE); Sven Saßning, Hamburg (DE)

(73) Assignee: Trioptics GmbH, Wedel (DE)

( * ) Notice: Subject to any disclaimer, the term of this patent is extended or adjusted under 35 U.S.C. 154(b) by 50 days.

(21) Appl. No.: 18/275,188

(22) PCT Filed: Jan. 10, 2022

(86) PCT No.: PCT/EP2022/050313
§ 371 (c)(1),
(2) Date: Jul. 31, 2023

(87) PCT Pub. No.: WO2022/161756
PCT Pub. Date: Aug. 4, 2022

(65) Prior Publication Data
US 2024/0102885 A1     Mar. 28, 2024

(30) Foreign Application Priority Data
Feb. 1, 2021   (DE) ..................... 10 2021 102 246.0

(51) Int. Cl.
*G01M 11/02* (2006.01)
*G01M 11/04* (2006.01)
(52) U.S. Cl.
CPC ........ *G01M 11/0264* (2013.01); *G01M 11/04* (2013.01); *G01M 11/0292* (2013.01)
(58) Field of Classification Search
CPC ............. G01M 11/0264; G01M 11/04; G01M 11/0292
(Continued)

(56) References Cited

U.S. PATENT DOCUMENTS 5,138,368 A  * 8/1992  Kahn ..................... G03F 7/2057
                                                              355/53
8,766,165 B1   7/2014  Zhovnirovsky et al.
(Continued)

FOREIGN PATENT DOCUMENTS

CN        105911716 A      8/2016
CN        206638403 U     11/2017
(Continued)

OTHER PUBLICATIONS

Translation of an Office Action cited in Japanese patent application No. JP 2023-546406; Jul. 19, 2024; 4 pp.
(Continued)

*Primary Examiner* — Md M Rahman
(74) *Attorney, Agent, or Firm* — Muncy, Geissler, Olds & Lowe, P.C.

(57) ABSTRACT

An apparatus for measuring the MTF or another optical property of an optical system includes an object to be imaged, which has a plurality of structures arranged in a plane and separated from one another, a two-dimensional image sensor, and collecting optics having a focal length f. The image sensor has a distance a from the collecting optics with $0.94 \cdot f \leq a \leq 1.1 \cdot f$. A holder for the optical system is arranged such that the optical system is located in a beam path between the object and the collecting optics. The image sensor and the collecting optics are configured such that all structures can be imaged by the optical system and the collecting optics onto the image sensor simultaneously.

12 Claims, 7 Drawing Sheets

(58) Field of Classification Search
USPC .......................................................... 356/124
See application file for complete search history.

(56) References Cited

U.S. PATENT DOCUMENTS

| | | | |
|---|---|---|---|
| 10,036,685 | B2 | 7/2018 | Goldberg et al. |
| 10,386,267 | B2 | 8/2019 | Heinisch et al. |
| 10,533,925 | B2 | 1/2020 | Goldberg et al. |
| 2002/0044275 | A1 | 4/2002 | Kitabayashi et al. |
| 2009/0231649 | A1* | 9/2009 | Sirat .................... A61B 5/1077 359/9 |
| 2012/0206627 | A1* | 8/2012 | Reshidko ........... G02B 13/0045 348/E5.045 |
| 2016/0021305 | A1 | 1/2016 | Lewis et al. |
| 2017/0059447 | A1* | 3/2017 | Ruprecht ........... G01M 11/0285 |
| 2017/0075068 | A1* | 3/2017 | Beresnev ............... G02B 6/262 |
| 2017/0336284 | A1 | 11/2017 | Goldberg et al. |
| 2018/0136079 | A1 | 5/2018 | Heinisch et al. |
| 2018/0306670 | A1 | 10/2018 | Goldberg et al. |
| 2018/0321597 | A1* | 11/2018 | Javaheri .............. G03F 7/70625 |
| 2020/0003655 | A1* | 1/2020 | Ehrmann ........... G01M 11/0264 |
| 2020/0249433 | A1* | 8/2020 | Lin ....................... G02B 13/004 |
| 2020/0400426 | A1* | 12/2020 | Gallardo ................ G01B 11/18 |
| 2022/0137425 | A1* | 5/2022 | Konrad .................. G02B 27/36 |

FOREIGN PATENT DOCUMENTS

| | | | | |
|---|---|---|---|---|
| CN | 1651599 | B | * 2/2019 | ......... G01N 21/8806 |
| DE | 102006059823 | A1 | 6/2008 | |
| DE | 102007057260 | A1 | 6/2009 | |
| JP | H02216428 | A | 8/1990 | |
| JP | H10288565 | A | 10/1998 | |
| JP | 2002039913 | A | 2/2002 | |
| JP | 2007212620 | A | 8/2007 | |
| JP | 2019007845 | A | 1/2019 | |
| TW | M543370 | U | 6/2017 | |
| TW | M579270 | U | 6/2019 | |
| TW | M583048 | U | 9/2019 | |
| WO | 2016180525 | A1 | 11/2016 | |
| WO | 2017201144 | A1 | 11/2017 | |

OTHER PUBLICATIONS

International Search Report and Written Opinion cited in corresponding international patent application No. PCT/EP2022/050313; Apr. 14, 2022; 10 pp.

Lawrence J. Curran et al., "Lens-testing system links multiple optics", Life Science, Vision Systems Design Article, Jun. 1, 2003, https://www.vision-systems.com/non-factory/life-sciences/article/16738375/lens-testing-system-links-multiple-optics.

* cited by examiner

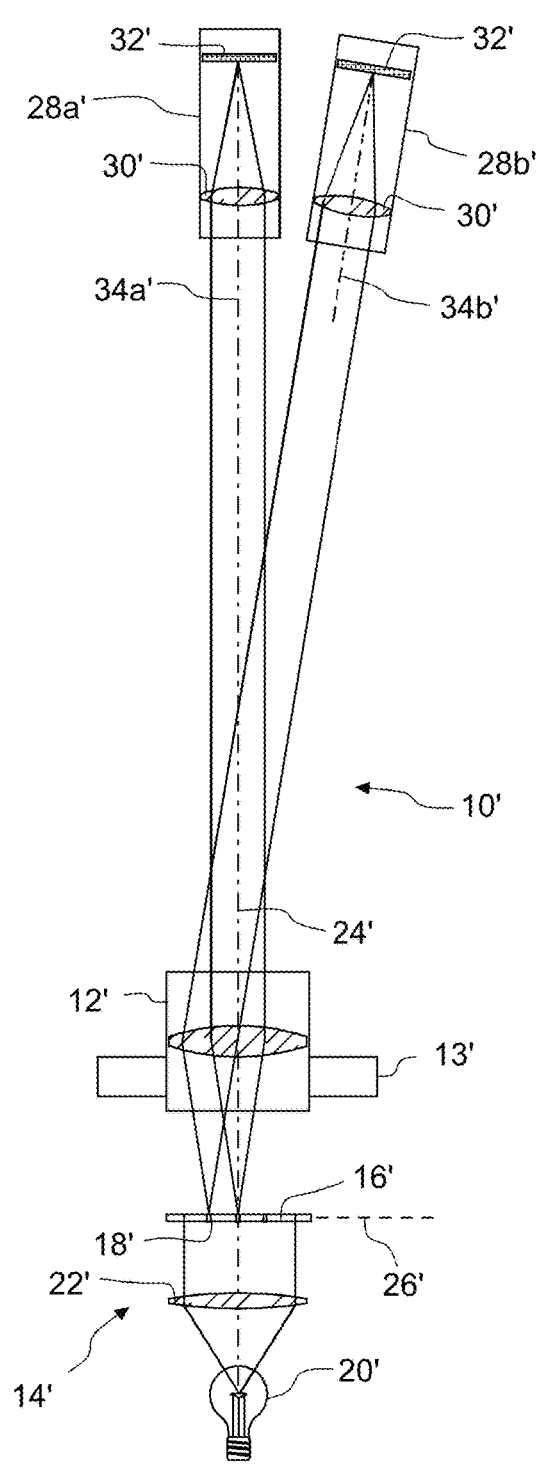
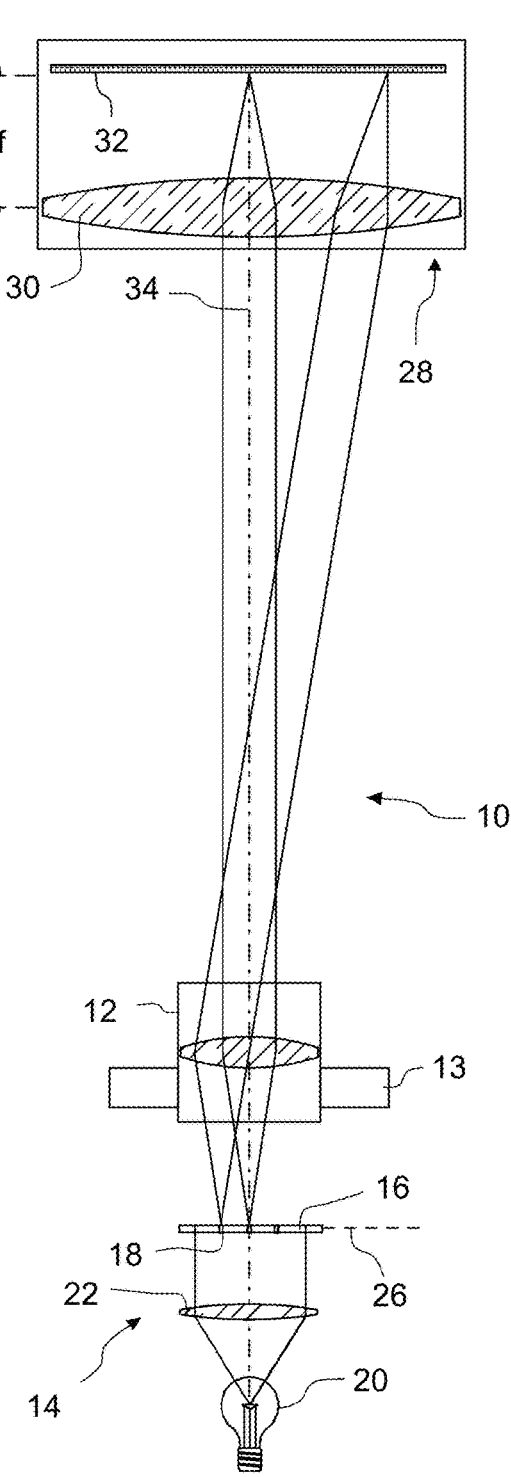
Fig. 1 (Prior Art)
Fig. 2

APPARATUS AND METHOD FOR MEASURING AN OPTICAL PROPERTY OF AN OPTICAL SYSTEM

CROSS-REFERENCE TO RELATED APPLICATIONS

This application claims the benefit of and priority to international patent application PCT/EP2022/050313 filed Jan. 10, 2022, which claims priority to earlier German patent application 10 2021 102 246.0 filed Jan. 1, 2021. The full disclosures of these patent applications are incorporated herein by reference.

BACKGROUND OF THE DISCLOSURE

1. Technical Field

The present disclosure relates to an apparatus and a method for measuring an optical property of an optical system. The optical property may be, for example, the imaging properties of a refractive or afocal optical system as can be described by the modulation transfer function (MTF), the distortion or chief ray angles.

2. Description of the Prior Art

In the prior art, apparatuses for measuring MTF are known in which a light pattern is generated in a focal plane of the optical system to be measured, which can consist, for example, of an arrangement of line crosses, dots or line patterns. To generate the light pattern, a reticle can be used, for example, which is illuminated by a light source and has a pattern of apertures.

On the opposite side of the optical system, a plurality of mutually independent cameras are arranged, each having a lens and an image sensor arranged in a focal plane of the lens. The cameras are distributed in such a way that each camera with its image sensor captures the image of exactly one cutout of the light pattern (typically of exactly one line cross). In this way, the modulation transfer function can be measured at several field positions independently of each other.

As a result of constantly increasing demands on the imaging properties of optical systems, it is desirable to measure the modulation transfer function or another imaging property of the optical system at as many field positions as possible. Since a separate camera, which requires a certain construction volume, is required for each cutout of the light pattern, it becomes difficult with larger numbers of field positions to arrange a corresponding number of cameras so densely that the measurement light can enter the corresponding cameras from the desired direction.

US 2018/0136079 A discloses an apparatus for measuring the MTF in which more cameras can be arranged than is the case with the conventional arrangement by means of a special beam folding.

However, even with this method, the MTF cannot be measured for all field points. This is particularly troublesome if the optical system to be measured has a variable focal length and the MTF is to be measured for different focal lengths. Since the individual images of the line crosses are created at different locations when the focal length is changed, the cameras must be realigned each time the focal length is changed. This is time-consuming and therefore not economical for the rapid measurement of optical systems manufactured in large quantities, e.g. machine-made optics of smartphone cameras.

SUMMARY OF THE DISCLOSURE

It is an object of the disclosure to provide an apparatus and a method for measuring an optical property of an optical system, in which the measurement can be carried out at as many different field points as possible with a minimum of equipment.

According to the disclosure, this object is achieved by an apparatus for measuring an optical property of an optical system comprising an object to be imaged having a plurality of structures arranged in a plane and separated from each other. The apparatus further comprises a two-dimensional image sensor, a collecting optics with a focal length f, the image sensor having a distance a from the collecting optics with $0.9 \cdot f \leq a \leq 1.1 \cdot f$, and a holder for the optical system. The holder is arranged so that the optical system is in the optical path between the object and the collecting optics. The image sensor and the collecting optics are configured such a way that all structures can be imaged by the optical system and the collecting optics onto the image sensor simultaneously.

The present disclosure is based on the idea that, at least in the case of optical systems with a long focal length and a correspondingly small field of view (FOV), the entire object and thus several structures separated from one another can be imaged simultaneously on the image sensor via the optical system and the collecting optics. The large and high-resolution image sensors required for this—ideally with more than 10 megapixels—are now available at reasonable cost. Due to the generally larger etendue, the collecting optics are also more complex than with the camera lenses used to date. However, since only one image sensor and one collecting optics have to be provided and may be arranged axially centered, the design and manufacturing effort for the apparatus according to the disclosure is nevertheless significantly lower than for conventional apparatuses in which a large number of cameras are arranged in a dome-like manner above the optical system to be measured.

The object can be an illuminated reticle, as is known in the prior art. The structures are usually line patterns or single or double crosshairs.

It is particularly advantageous if the holder is arranged in the diverging beam path. The optical system to be measured can then have a variable focal length and, in particular, be designed as a zoom lens. Whereas in conventional apparatuses the images of the structures generally migrate completely or partially out of the image fields of the individual cameras when the focal length of the optical system to be measured is changed, in the apparatus according to the disclosure the images can always be captured completely by the image sensor when the focal length is changed. Thus, no adjustments or readjustments have to be made if the focal length of the optical system are changed. This means that the apparatus can also be used to check the imaging properties as part of the quality control of zoom lenses intended for use in devices such as smartphones or webcams.

In another embodiment, a collimator is arranged in the light path between the object and the holder. In this case, the optical system to be measured is not in a diverging beam path, but in a parallel beam path. Such an arrangement is advantageous when the optical system to be measured itself has no refractive power and is therefore afocal. Examples of such optical systems are bilateral telecentric lenses, prisms or waveguides. The optical property to be measured can then be a photometric quantity such as an angle-dependent luminance or color distribution.

It is particularly advantageous if the collimator is a conoscopic lens. This allows a virtual aperture to be created in a plane parallel to the surface of the specimen. This property of the conoscope has the advantage that no physical aperture has to be introduced into the beam path near the specimen.

The object can be arranged to move along an optical axis of the apparatus to vary the distance between the collimator and the object. If the object is positioned exactly in the focal plane of the collimator, the optical system to be measured is in the collimated beam path. In all other axial displacement positions of the object, the beam path is only approximately collimated. In this way, it is possible to determine, for example, at which optical conditions the optical system to be measured has the best optical properties. In one example, the object and the collimator are arranged in a common housing for this purpose.

If the collimator also has a variable focal length, changing the focal length of the collimator and the distance to the object can change the diameter of the area that is illuminated in the optical system.

The measuring light emerging from the optical system to be measured does not have to be perfectly collimated (i.e. the image of the object is at infinity). Even an image at a great distance, e.g. at more than two meters, allows a highly accurate measurement of the optical property without having to make significant sacrifices in measurement accuracy.

If the deviations from the collimated beam path are no longer tolerable, this can be accommodated by moving the image sensor along the optical axis. The same effect can be achieved if the collecting optics have a variable focal length. The distance a between the collecting optics and the image sensor can therefore deviate by up to 10% from the focal length f of the collecting optics, leading to the condition $0.9 \cdot f \leq a \leq 1.1 \cdot f$. In some embodiments the deviation is a maximum of 5%, in other embodiments no deviation is allowed.

With regard to the method, the object set out at the beginning is solved by a method for measuring an optical property of an optical system, which comprises the following steps:

Providing a two-dimensional image sensor, a collecting optics having a focal length f, the image sensor having a distance a from the collecting optics with $0.9 \cdot f \leq a \leq 1.1 \cdot f$, and an object having a plurality of structures arranged in a plane and separated from each other;

Insertion of the optical system to be measured into the beam path between the object and the collecting optics, Simultaneous imaging of the object within the field of view of the specimen and the collecting optics onto the image sensor using the optical system and the collecting optics;

Evaluation of an image of the object formed on the image sensor to determine the optical property.

The considerations and advantages explained above in connection with the apparatus according to the disclosure apply accordingly to the method.

In one embodiment, the optical system has a variable focal length. The optical properties of the optical system are measured for at least two different focal lengths.

In another embodiment, the optical system is afocal. In this case, a collimator is arranged in the light path between the object and the optical system. The object can be moved along an optical axis of the apparatus between successive measurements of the same optical system or between measurements of different optical systems.

The method according to the present disclosure can be used to measure at least one optical property selected from the group consisting of: distortion, image field curvature, field of view and edge light fall-off. Since the method according to the disclosure uses a large image sensor to be able to image an object in the entire field of view of the specimen, a high measurement point density is obtained. As a result, the aforementioned optical properties of the specimen can be measured with high precision and in higher orders. For example, it is possible to determine a high-order distortion polynomial, which was only possible to a limited extent with the known measuring apparatuses. In addition, the large image sensor allows structures to be imaged that extend across the entire image field, e.g. solid lines. This enables new approaches to evaluation, which is advantageous for measuring the field of view, among other things.

BRIEF DESCRIPTION OF THE DRAWINGS

In the following, embodiments of the present disclosure are explained in more detail with reference to the drawings. In these show:

FIG. 1 a schematic meridional section through a measuring apparatus according to the prior art;

FIG. 2 a schematic meridional section through a measuring apparatus according to a first embodiment;

DESCRIPTION OF EMBODIMENTS

1. Prior Art

Figure 3:
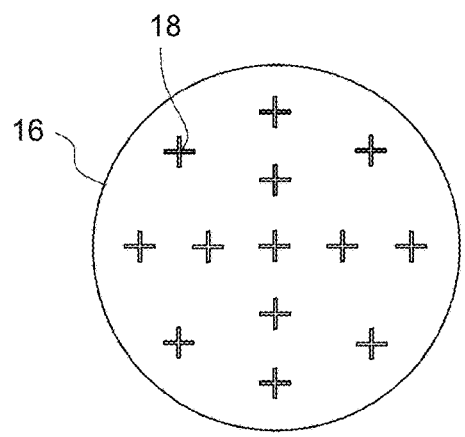
FIG. 3 a top view of the reticle used as object in the embodiment according to FIG. 2.

In order to explain the operation of the measuring apparatus according to the disclosure, reference is first made to FIG. 1, in which a measuring apparatus according to the prior art is shown in a schematic meridional section and is designated 10' in its entirety.

The measuring apparatus 10' is intended to measure the modulation transfer function (MTF) of an optical system, hereinafter referred to as specimen 12'. The specimen 12' is indicated here only as a single lens; often it will be an optical system with several refractive and/or reflective optical elements. The specimen 12' is held by a holder 13'. The holder 13' can comprise an adjustment device with which the specimen 12' can be positioned axially centered and untilted in the beam path of the device 10'.

The modulation transfer function is an important tool for quantitatively evaluating the imaging quality of optical systems and describes the resolving power of an optical system by the ratio of the relative image contrast to the relative object contrast. When an object is imaged by an optical system, there is inevitably a reduction in quality in the image plane due to aberrations and diffraction phenomena. Manufacturing deviations as well as assembly and alignment errors also weaken the imaging performance of the specimen 12'.

For measuring the modulation transfer function, the specimen 12' images an object; the modulation transfer function of the specimen 12' can be inferred from the image of the object. The object imaged by the specimen 12' is formed by a light pattern generated by a light pattern generating device 14'. The light pattern generating device 14' has a reticle 16' which is uniformly illuminated by a light source 20' represented as a bulb using a condenser 22'.

A reticle is a glass sheet that carries a structured coating on one side. The structuring can be produced, for example, by a photolithographically defined etching process. In FIG. 1, several light-transmitting structures in the coating are designated with 18'.

The specimen 12' is arranged in the measuring apparatus 10' so that its optical axis is aligned with a reference axis 24' of the measuring apparatus 10'. The reference axis 24' of the apparatus 10' thereby coincides with the optical axis of the condenser 22'. In addition, the holder 13' is used to axially position the specimen 12' such that the reticle 16' is arranged in the focal plane 26' of the specimen 12'. As a result, the light pattern defined by the structures 18' is imaged to infinity by the specimen 12'.

Two identically constructed cameras 28a', 28b' are arranged on a side of the specimen 12' opposite the light pattern generation device 14'. The cameras 28a', 28b' each contain a lens 30' and a spatially resolving image sensor 32', which is located in a focal plane of the lens 30'. A cutout of the light pattern generated by the light pattern generating device 14' is thereby formed on the image sensor 32' in each case. The cutout is thereby determined, among other things, by the arrangement of the cameras 28a', 28b' with respect to the reference axis 24' and by the field of view of the cameras. The camera 28a', whose optical axis 34a' is aligned with the reference axis 24', captures an image of a structure 18' in the center of the reticle 16'. The optical axis 34b' of the other camera 28b' is inclined to the reference axis 24'. As a result, the camera 28b' captures an image of one of the outer structures 18'.

Other cameras are usually arranged around the central camera 28', which are not shown in FIG. 1 for reasons of clarity. These other cameras capture the images of the other structures 18'. By evaluating the images of the structures 18' formed on the image sensors 32' of the cameras 28a', 28b', the modulation transfer function of the specimen 12' can be determined in a manner known as such.

The conventional setup shown in FIG. 1 is particularly advantageous when the focal length of the specimen is small and the field of view is correspondingly large. Cameras can then be arranged in such a way that they can pick up light which leaves the specimen 12' at very large angles relative to the reference axis 24'.

With the known measuring apparatus 10' shown in FIG. 1, it is not possible to make a statement about the modulation transfer function at field points that are not covered by the field of view of one of the cameras 28a', 28b'. However, it is often desirable to measure the modulation transfer function at as many different field positions as possible. It is clear from FIG. 1 that, because of the limited installation space, the number of cameras cannot be increased arbitrarily.

2. First Embodiment

FIG. 2 shows a meridional section of an apparatus according to the disclosure and designated 10, in an illustration similar to FIG. 1.

Components marked with unstroked reference numerals X correspond to components X' in FIG. 1 and are only explained again if there are differences worth mentioning.

The plurality of cameras 28a, 28b are replaced in the apparatus 10 according to the disclosure by a single camera 28, which also has collecting optics 30. In the illustrated embodiment, the distance a between a sensor plane 33 and the collecting optics 30 (or, more precisely, its image-side main plane H) is equal to the focal length f of the collecting optics 30. Measuring light that is incident onto the collecting optics 30 as collimated beam is therefore focused on the image sensor 32.

The dimensions of the image sensor 32 and the collecting optics 30 may be selected such that the entire field of view of the specimen 12 is captured by the image sensor 32. This means that all structures 18 on the reticle 16, which is shown in a top view in FIG. 3, can be imaged simultaneously by the specimen 12 and the collecting optics 30 on the image sensor 32, as long as the structures 18 are in the field of view of the specimen. If, for example, further field points are to be measured in another measurement at positions which are located between the structures 18, it is only necessary to exchange the reticle 16 for another reticle which contains structures at the desired field positions. The use of structures that extend over the entire reticle is also possible in principle.

Figure 4:
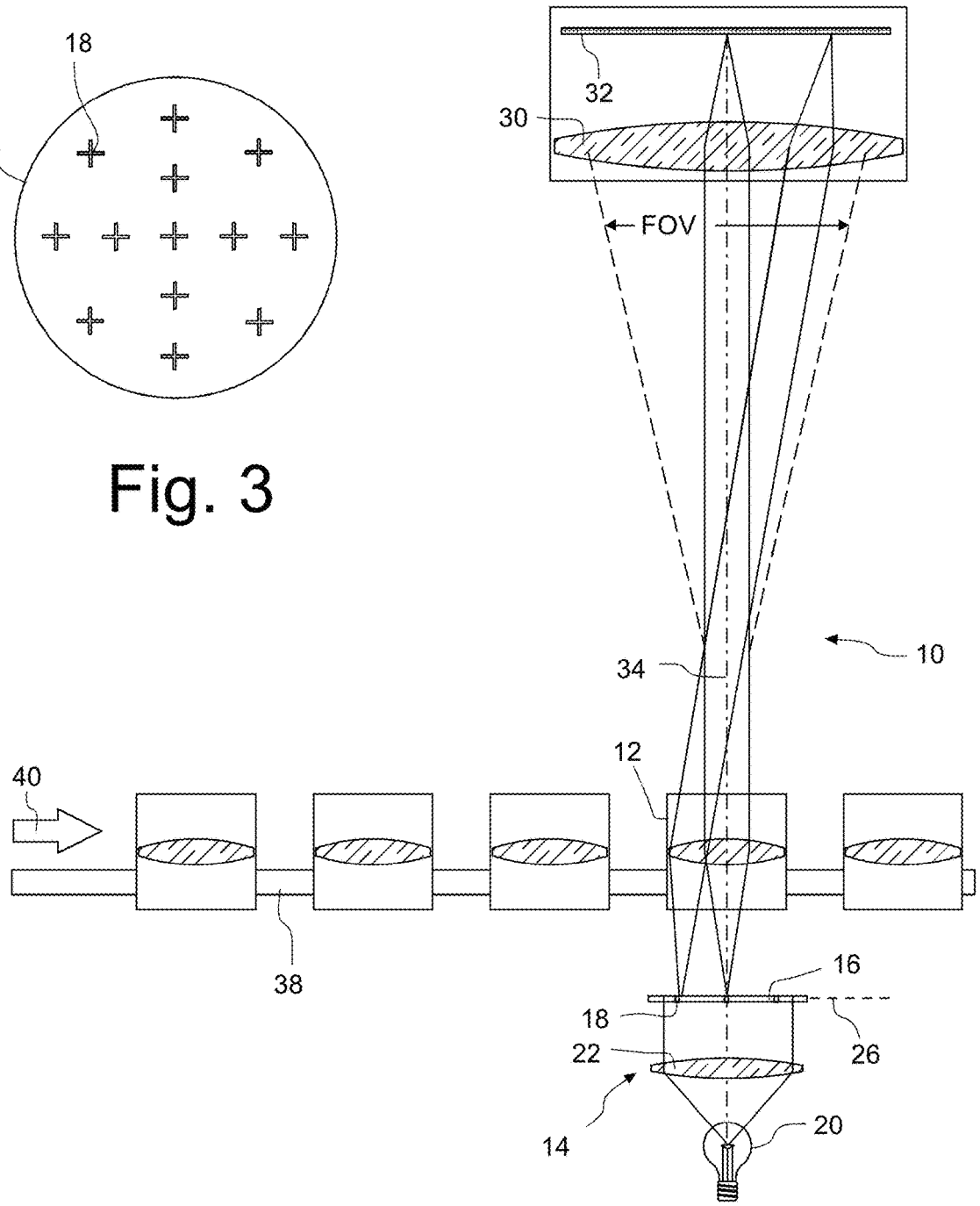
FIG. 4 the apparatus shown in FIG. 3 with additionally drawn rays and a feeding device for similar optical systems to be measured.

In FIG. 4, the FOV (Field Of View) of the specimen 12 is indicated by dashed lines. The field of view of an imaging optical system is the area in the three-dimensional object space that can be sharply imaged with the optical system. In the rectangular imaging fields typically present, the field of view is an infinite truncated pyramid whose pyramid apex lies in the entrance pupil of the specimen 12. The aperture angles of the truncated pyramid are determined by the dimensions of the image field and the focal length of the specimen 12.

In FIG. 4, it is assumed that the specimen 12 is measured in the reverse direction of light. In later use, the light passes through the specimen 12 from above as seen in FIG. 4, which is why the field of view FOV is drawn on the side of the image sensor 32. On the image side, the field of view FOV corresponds to the image space, i.e. each point in the field of view corresponds to a point in the image space.

The apparatus 10 is characterized by the fact that the entire reticle 16 lying in the field of view FOV or image space is simultaneously imaged onto the image sensor 32. The collecting optics 30 and the image sensor 32 are thus designed so that all field points that can be imaged by the specimen 12 are actually imaged on the image sensor 32. In this way, distortion of the specimen 12, for example, can be measured very easily and with a high degree of accuracy, since, unlike conventional apparatuses of this type, no individual images are produced, but the entire field of view/image field is captured. Typically, a reticle 16 whose structures 18 form a regular grid is used to measure the distortion.

It is also very easy to measure the size of the field of view FOV, since the image sensor 32 is normally larger than the field of view. Furthermore, any edge light fall-off can be easily detected with the apparatus 10.

Indicated by 38 in FIG. 4 is a feed device with which a large number of similar specimens 12 can be fed to the apparatus 10 in an automated quality inspection process and measured there with respect to their optical properties. The specimens are conveyed step by step along the feed direction indicated by an arrow 40 in such a way that the specimens 12 are positioned one after the other in the beam path of the apparatus 10.

Figure 5A:
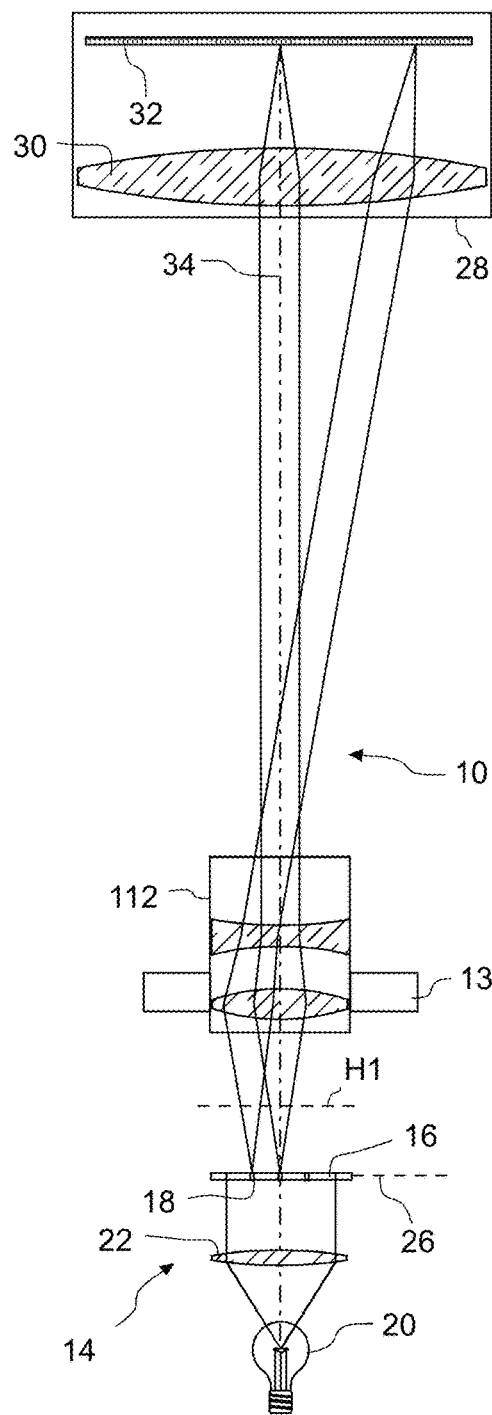
FIGS. 5a and 5b meridional sections through the apparatus shown in FIG. 2 during the measurement of a zoom lens in different displacement positions of the zoom lens.
Figure 5B:
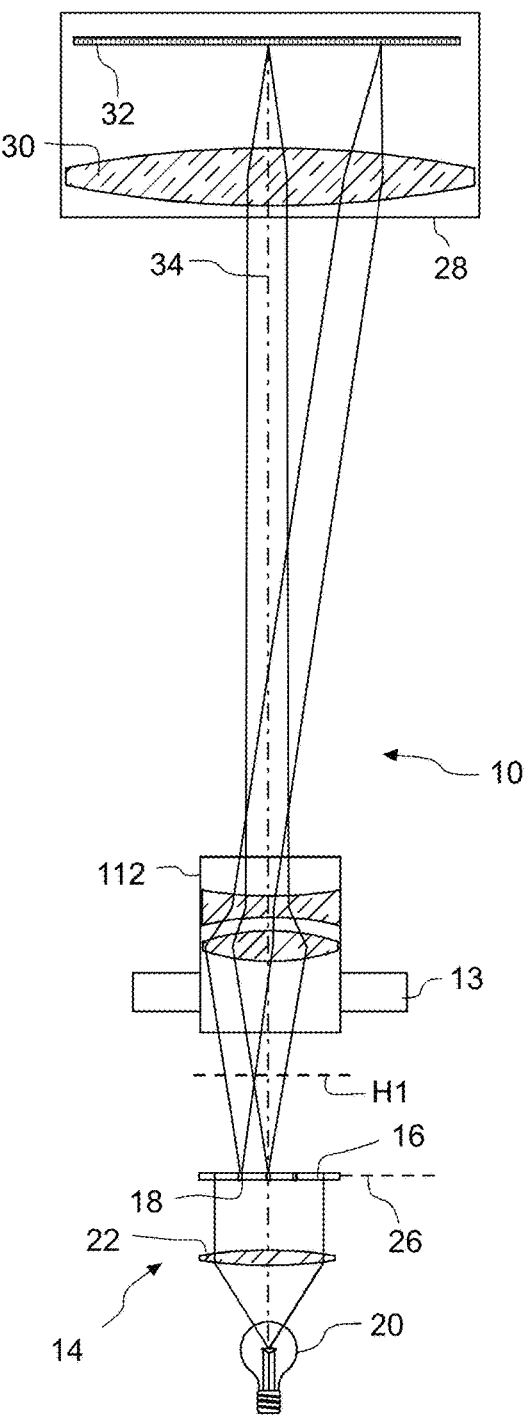

FIGS. 5a and 5b show meridional sections through the apparatus 10 shown in FIGS. 2 and 4 during the measurement of a zoom lens 112 in different zoom positions. The position of the object-side main plane H1 of the zoom lens 112 is indicated in each case by a dashed line. The advantages of the apparatus 10 according to the present disclosure are particularly obvious when measuring the zoom lens 112. Indeed, when the zoom lens 112 is moved axially by shifting a plurality of lens elements, the images of the structures 18 do not remain stationary, but move in a radial direction across the image plane. In FIGS. 5a and 5b, this can be seen in the position of the off-axis pixel on the image sensor 32. With conventional apparatuses of this type, as shown in FIG. 1, the images of the structures 18 would migrate out of the field of view of the individual cameras 28a, 28b and could no longer be evaluated. With the apparatus 10 according to the disclosure, on the other hand, these images can be captured and evaluated simultaneously in all positions of the zoom lens 112, i.e., regardless of the imaging scale 8, without having to adjust the apparatus 10.

3. Second Embodiment

Figure 6:
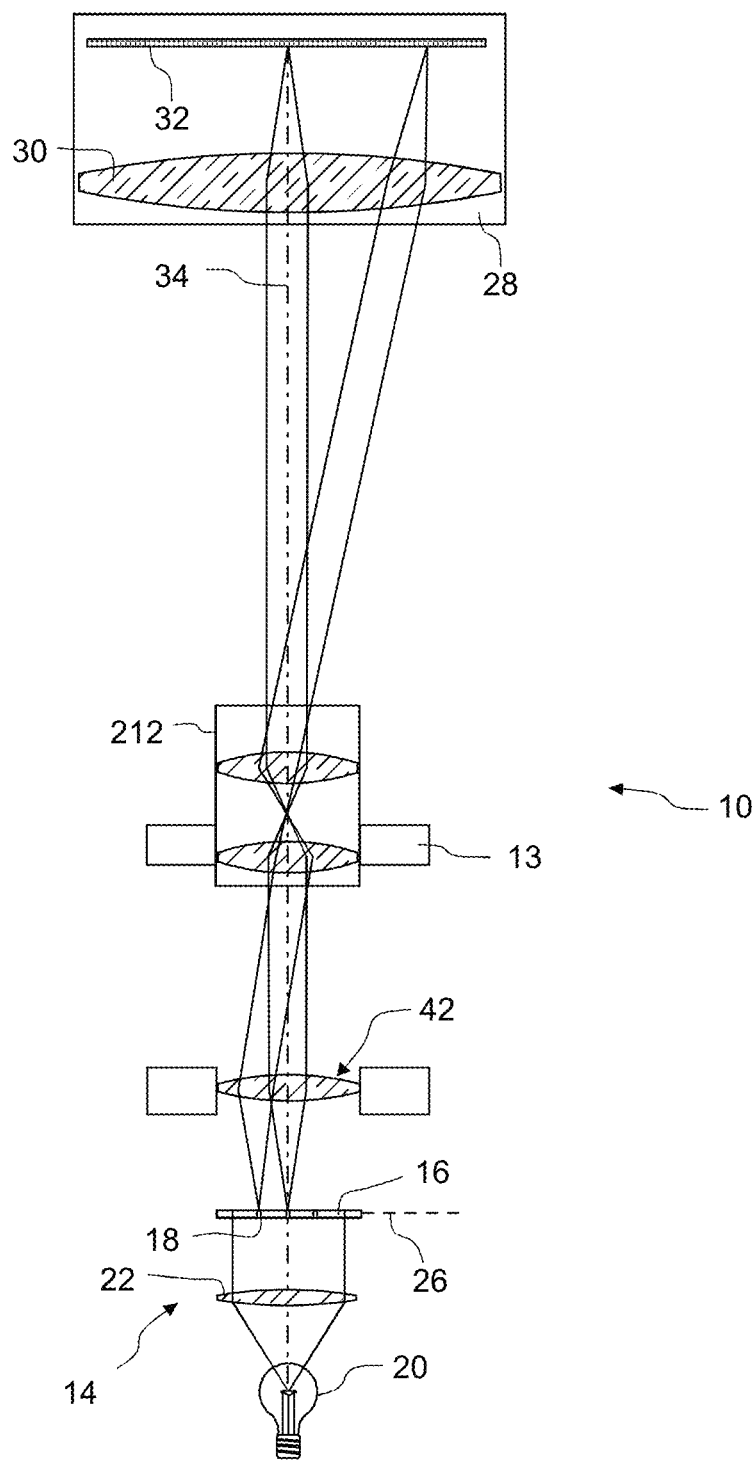
FIG. 6 a schematic meridional section through a measuring apparatus according to a second embodiment for measuring an afocal optical system.

FIG. 6 shows a meridional section of an apparatus 210 according to the disclosure in accordance with a second embodiment. The apparatus 210 is configured to measure optical properties of specimens 212 that are afocal. In the illustrated embodiment, the specimen 212 is a bilateral telecentric lens. However, prisms or waveguides, such as those used in AR or VR systems, are also afocal.

In the apparatus 210, a collimator 42 is arranged between the reticle 16 and the holder 13 for the specimen 212, in whose focal plane 226 the reticle 16 is located. The collimator 42 images the reticle 16 to infinity so that the specimen 212 is located in the collimated beam path. Otherwise, the apparatus 210 does not differ from the apparatus 10 of the first embodiment.

The collimator 42 can be designed as a conoscopic lens. This allows a virtual aperture to be optically created in the plane of the specimen without having to introduce a physical aperture into the beam path near the specimen.

4. Third Embodiment

Figure 7A:
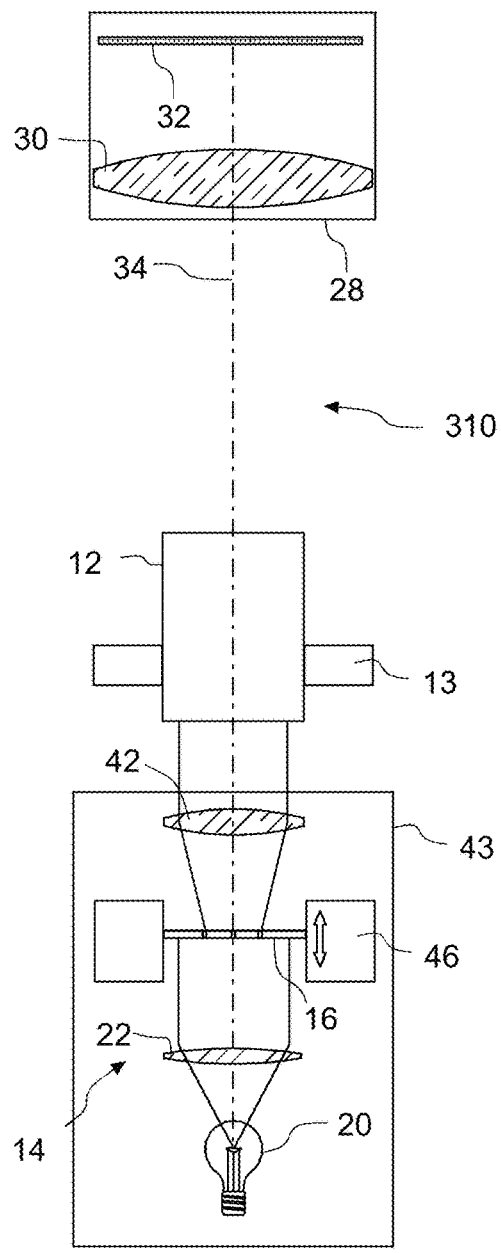
FIGS. 7a and 7b meridional sections through a measuring apparatus according to a third embodiment, in which the reticle is axially displaceably arranged, in different displacement positions of the reticle.
Figure 7B:
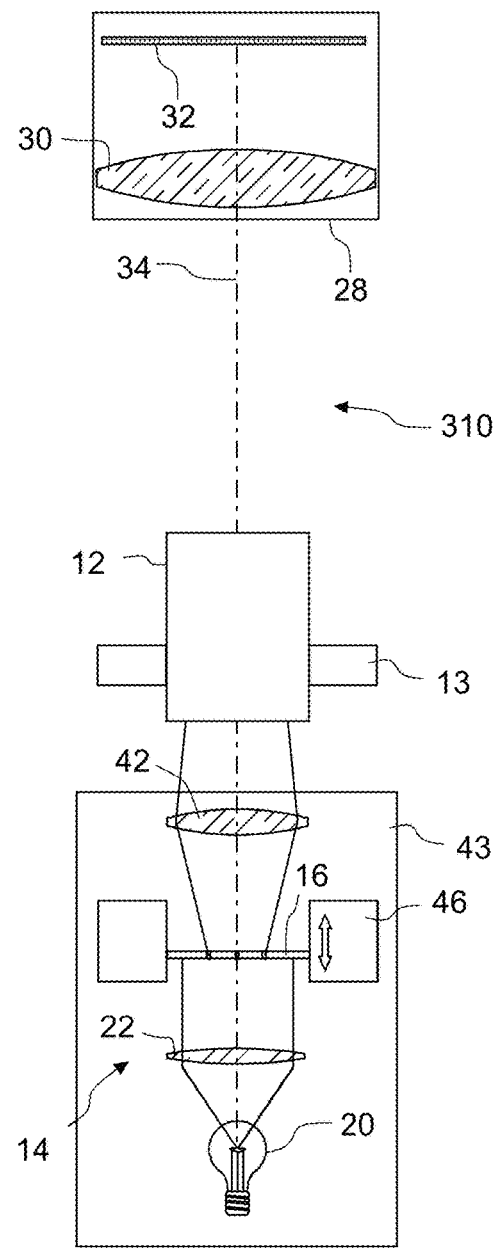

FIGS. 7a and 7b show meridional sections of an apparatus 310 according to the disclosure in accordance with a third embodiment. The apparatus 310 is substantially the same as the apparatus 210 shown in FIG. 6, but here the collimator 42 is housed in a common housing 43 together with the light pattern generating device 14. In addition, the reticle 16 of the light pattern generating device 14 is movable along the optical axis 34 by means of an adjusting device 46. If the reticle 16 is located exactly in the focal plane of the collimator 42, as shown in FIG. 7a, the collimator 42 images the structures 18 on the reticle 16 to infinity so that colli- mated light passes through the specimen 12. If the reticle 16 is moved out of the focal plane of the collimator 42, the light behind the collimator 42 is no longer collimated, but diverged or converged. FIG. 7b shows the case where the specimen 12 is in the convergent beam path.

Figure 8A:
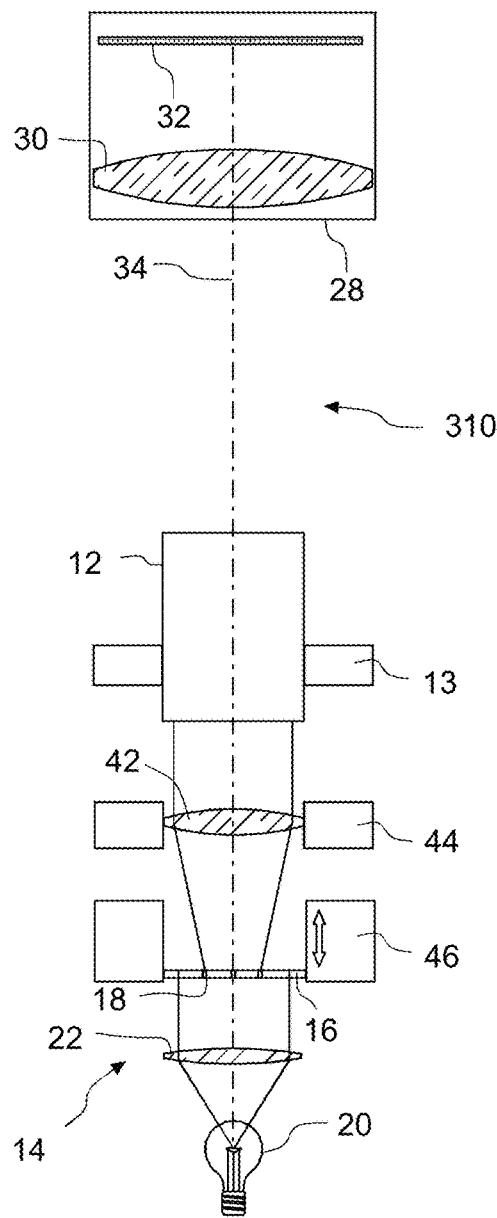
FIGS. 8a and 8b meridional sections through a variant of the measuring apparatus shown in FIGS. 7a and 7b, in which the collimator additionally has a variable refractive power, in various displacement positions.
Figure 8B:
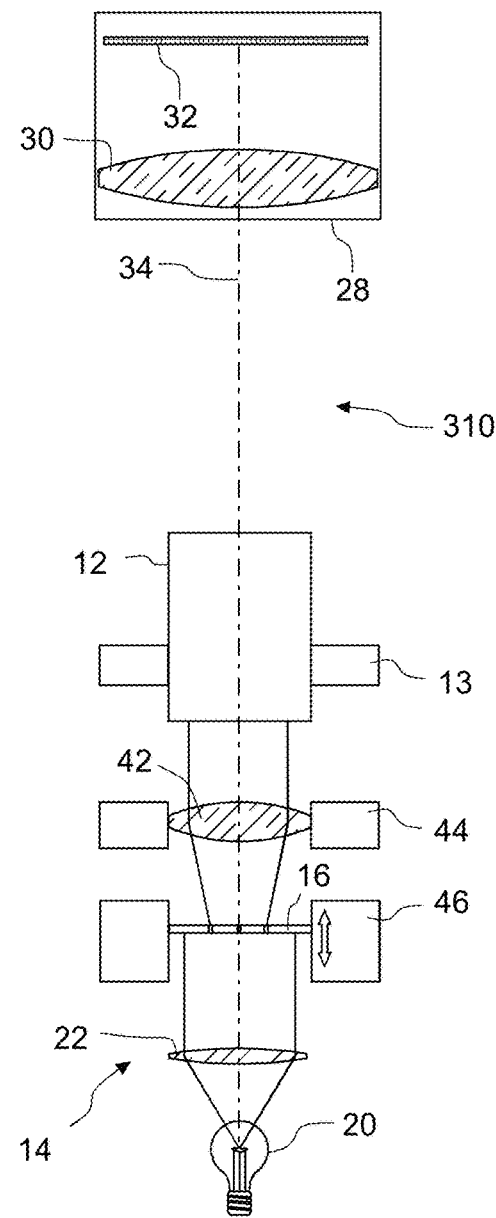

If the collimator additionally has a variable focal length, which is indicated in FIGS. 8a and 8b by an adjustment device 44, then beam paths having different beam diameters can be set by simultaneously adjusting the collimator 42 and moving the reticle 16, as shown by a comparison of FIGS. 8a and 8b. The ability to adjust, without loss of light, the size of the area illuminated in the specimen 12 is sometimes advantageous in certain measurement tasks, for example when measuring photometric quantities.

5. Fourth Embodiment

Figure 9A:
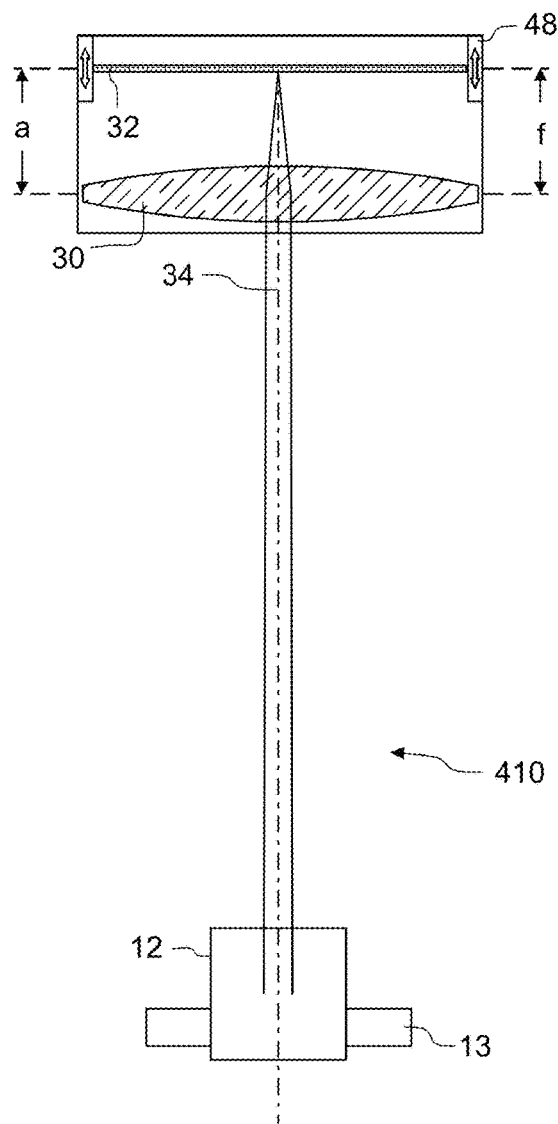
FIGS. 9a and 9b meridional sections through a measuring apparatus according to a fourth embodiment, in which the image sensor is arranged to be axially displaceable, in different displacement positions.
Figure 9B:
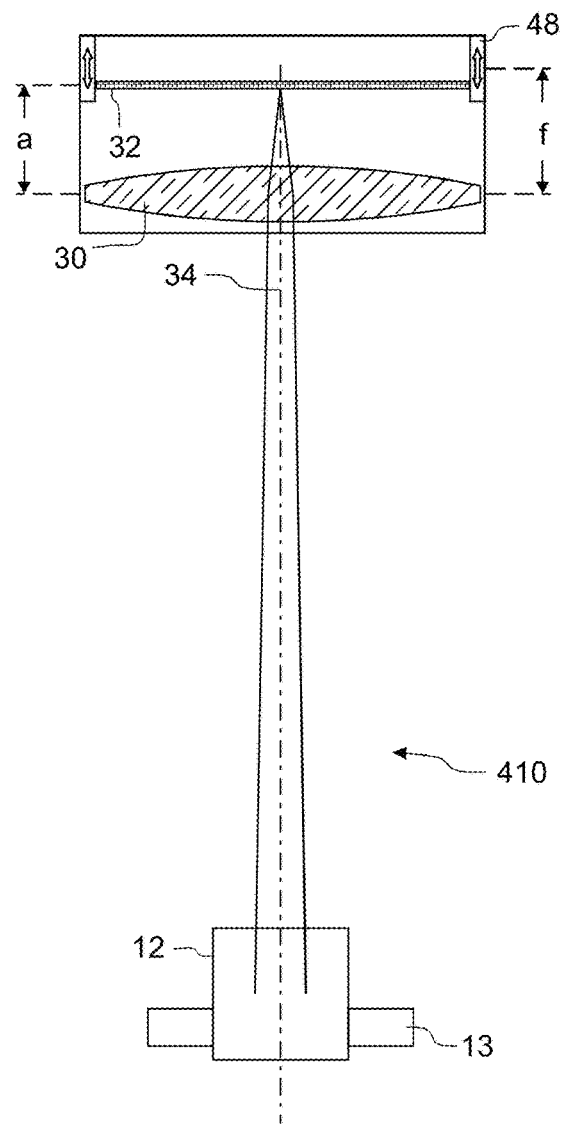

FIGS. 9a and 9b show meridional sections through an apparatus 410 according to the disclosure in accordance with a fourth embodiment. In this embodiment, the image sensor 32 is movable along the optical axis 34 of the apparatus 410 by means of an adjustment device 48. This is particularly advantageous if the measuring light emanating from the specimen 12 is not exactly collimated. The reason for this may be, for example, that the reticle 16 is not located exactly in the focal plane of the specimen 12, or that in the embodiment shown in FIGS. 6 to 8 the specimen 12 is only approximately afocal.

FIG. 9a illustrates the case where the light emanating from the specimen 12 is exactly collimated and the distance a between the collecting optics 30 and the image sensor 32 is equal to the focal length f of the collecting optics 30. FIG. 9b illustrates how a sharp image can be obtained by reducing the distance a, even though the light emanating from the specimen 12 converges slightly. Generally, the distance a deviates no more than 10% from the focal length f.

The apparatus 410 can also be used to measure image field curvature in a simple manner. For this purpose, for example, several images of the reticle 16 can be taken in different axial displacement positions of the image sensor 32 and the image contrast can be measured as a function of the distance a.

What is claimed is:

1. An apparatus for measuring a modulation transfer function (MTF) of an optical system, the apparatus comprising:
   an object to be imaged having a plurality of structures arranged in a plane and separated from each other;
   a two-dimensional image sensor;
   collecting optics having a focal length f, wherein the two-dimensional image sensor has a distance a from the collecting optics with $0.9 \cdot f \leq a \leq 1.1 \cdot f$, and wherein the image sensor and the collecting optics are configured such that all of the structures of the object are imaged by the optical system and the collecting optics onto the image sensor simultaneously;
   a holder configured to hold the optical system; and
   an evaluation unit configured to determine the MTF by evaluating an image of the object formed on the image sensor,
   wherein the holder is arranged as a feed device, in which the optical system and additional optical systems that are similar to the optical system are fed stepwise to the apparatus in an automated quality inspection process, such that the optical system and the additional optical systems are fed so as to be individually located, one after the other, in a beam path between the object and the collecting optics.

2. The apparatus of claim 1, wherein the object is an illuminated reticle.

3. The apparatus of claim 1, wherein the structures are crosshairs.

4. The apparatus of claim 1, wherein the holder is arranged in a diverging beam path.

5. The apparatus of claim 1, wherein a collimator is arranged in a light path between the object and the holder.

6. The apparatus of claim 5, wherein the collimator is a conoscopic lens.

7. The apparatus of claim 5, wherein the object is movable along an optical axis of the apparatus to vary a distance between the collimator and the object.

8. The apparatus of claim 1, wherein the image sensor is movable along an optical axis of the apparatus.

9. A method of measuring a modulation transfer function (MTF) of an optical system, the method comprising the following steps:
   providing an object, a two-dimensional image sensor, and collecting optics having a focal length f, wherein the image sensor has a distance a from the collecting optics with $0.9 \cdot f \leq a \leq 1.1 \cdot f$;
   inserting the optical system and additional optical systems that are similar to the optical system into a beam path between the object and the collecting optics, wherein a feed device is provided to feed the optical system and the additional optical systems stepwise in an automated quality inspection process, such that optical system and the additional optical systems are fed so as to be individually located, one after the other, in the beam path between the object and the collecting optics;
   simultaneously imaging the object within a field of view of the optical system and the collecting optics onto the image sensor using the optical system and the collecting optics; and
   determining the MTF by evaluating an image of the object formed on the image sensor.

10. The method of claim 9, wherein the optical system has a variable focal length, and wherein the MTF of the optical system is measured for at least two different focal lengths.

11. The method of claim 9, wherein the optical system is afocal, and wherein a collimator is disposed in the light path between the object and the optical system.

12. An apparatus for measuring an optical property a modulation transfer function (MTF) of an optical system, the apparatus comprising:
   an object to be imaged having a plurality of structures;
   a two-dimensional image sensor that is movable along an optical axis of the apparatus;
   collecting optics, wherein the two-dimensional image sensor has a distance a from the collecting optics with $0.9 \cdot f \leq a \leq 1.1 \cdot f$, and wherein the image sensor and the collecting optics are configured such that all of the structures of the object are imaged by the optical system and the collecting optics onto the image sensor simultaneously;
   a holder configured to hold the optical system; and
   an evaluation unit configured to determine the MTF by evaluating an image of the object formed on the image sensor,
   wherein the holder is arranged as a feed device, in which the optical system and additional optical systems that are similar to the optical system are fed stepwise to the apparatus in an automated quality inspection process, such that the optical system and the additional optical systems are fed so as to be individually located, one after the other, in a beam path between the object and the collecting optics.

* * * * *